United States Patent
Kötschau et al.

(10) Patent No.: US 10,965,185 B2
(45) Date of Patent: Mar. 30, 2021

(54) MEDIA TRANSPORT IN ROTOR SHAFT

(71) Applicant: ThyssenKrupp Presta TecCenter AG, Eschen (LI)

(72) Inventors: Christian Kötschau, Chemnitz (DE); Daniel Paul, Burkhardtsdorf (DE)

(73) Assignee: ThyssenKrupp Presta TecCenter AG, Eschen (LI)

( * ) Notice: Subject to any disclaimer, the term of this patent is extended or adjusted under 35 U.S.C. 154(b) by 605 days.

(21) Appl. No.: 15/315,459

(22) PCT Filed: May 18, 2015

(86) PCT No.: PCT/EP2015/060909
§ 371 (c)(1),
(2) Date: Dec. 1, 2016

(87) PCT Pub. No.: WO2015/185349
PCT Pub. Date: Dec. 10, 2015

(65) Prior Publication Data
US 2018/0191224 A1    Jul. 5, 2018

(30) Foreign Application Priority Data
Jun. 4, 2014 (DE) ............... 10 2014 107 843.8

(51) Int. Cl.
*H02K 7/00* (2006.01)
*H02K 9/10* (2006.01)
*H02K 9/19* (2006.01)

(52) U.S. Cl.
CPC ............. *H02K 7/003* (2013.01); *H02K 9/10* (2013.01); *H02K 9/19* (2013.01)

(58) Field of Classification Search
CPC ............. H02K 7/003; H02K 9/10; H02K 9/19
See application file for complete search history.

(56) References Cited

U.S. PATENT DOCUMENTS

| | | | |
|---|---|---|---|
| 5,589,720 A | 12/1996 | Berger | |
| 6,191,511 B1 * | 2/2001 | Zysset | H02K 9/19 310/53 |

(Continued)

FOREIGN PATENT DOCUMENTS

| | | |
|---|---|---|
| AT | 001 351 U | 3/1997 |
| DE | 951464 C | 10/1956 |

(Continued)

OTHER PUBLICATIONS

English language Abstract of DE102011105614A1 listed above.

(Continued)

*Primary Examiner* — Jue Zhang
(74) *Attorney, Agent, or Firm* — thyssenkrupp North America, LLC

(57) ABSTRACT

A rotor hollow shaft for a rotor of an electric machine may include a cylinder barrel that is closed off on both sides by end flanges. On each side, a shaft journal may be positioned or formed on the end flanges. At least one of the shaft journals may include an access bore that provides access to a shaft cavity surrounded by the cylinder barrel. A leadthrough element may be fitted into the access bore so as to impart a sealing action with respect to the shaft cavity. The leadthrough element may extend through the shaft cavity to the shaft journal on the other side of the cylinder barrel, where the leadthrough element may likewise be fitted so as to impart a sealing action with respect to the shaft cavity. The leadthrough element may permit the leadthrough of a liquid or gaseous medium.

11 Claims, 2 Drawing Sheets

(56) References Cited

U.S. PATENT DOCUMENTS

| | | | |
|---|---|---|---|
| 6,809,445 B2 * | 10/2004 | Reddy | H02K 5/225 310/71 |
| 9,257,883 B2 * | 2/2016 | Buttner | H02K 1/32 |
| 2003/0146667 A1 | 8/2003 | Hattori et al. | |
| 2004/0066098 A1 | 4/2004 | Doherty | |
| 2006/0066156 A1 | 3/2006 | Dong et al. | |
| 2007/0273232 A1 | 11/2007 | Ong et al. | |
| 2012/0104884 A1 | 5/2012 | Wagner | |
| 2012/0205996 A1 * | 8/2012 | Buttner | H02K 9/20 310/54 |
| 2013/0193785 A1 * | 8/2013 | Kimmich | H02K 5/225 310/52 |
| 2014/0339937 A1 * | 11/2014 | Tokunaga | H02K 5/225 310/71 |

FOREIGN PATENT DOCUMENTS

| | | | | |
|---|---|---|---|---|
| DE | 4240045 C1 | 2/1994 | | |
| DE | 19913199 A1 | 10/2000 | | |
| DE | 20307198 U1 | 9/2003 | | |
| DE | 102006043550 A1 * | 8/2007 | | B23Q 11/127 |
| DE | 11 2006 001 929 T | 5/2008 | | |
| DE | 102008020426 A1 | 10/2009 | | |
| DE | 112010004773 T5 | 10/2012 | | |
| DE | 102011105614 A1 | 1/2013 | | |
| DE | 10 2012 203 697 A | 9/2013 | | |
| DE | 102013200450 A1 * | 7/2014 | | H02K 9/08 |
| EP | 0659308 B1 | 6/1995 | | |
| EP | 1953896 A1 | 8/2008 | | |
| GB | 191126756 A | 4/1912 | | |
| GB | 1456116 A * | 11/1976 | | H02K 9/19 |
| JP | S5497707 A | 8/1979 | | |
| JP | 2004159402 A | 6/2004 | | |
| JP | 201155601 A | 3/2011 | | |
| JP | 201290411 A | 5/2012 | | |
| JP | 201487130 A | 5/2014 | | |
| WO | 2014057245 A | 4/2014 | | |

OTHER PUBLICATIONS

English translation of International Search Report for International patent application No. PCT/EP2015/060909; dated Sep. 2, 2015.
English language Abstract of DE4240045C1 listed above.
English language Machine Translation of DE20307198U1 listed above.
English language Abstract of DE19913199A1 listed above.
English language Abstract for DE 112010004773 T5 listed above.
English language Machine translation for DE 951464 C listed above.
English language Abstract for DE 102008020426 A1 listed above.

* cited by examiner

MEDIA TRANSPORT IN ROTOR SHAFT

CROSS REFERENCE TO RELATED APPLICATIONS

This application is a U.S. National Stage Entry of International Patent Application Serial Number PCT/EP2015/060909, filed May 18, 2015, which claims priority to German Patent Application No. DE 10 2014 107 843.8 filed Jun. 4, 2014, the entire contents of both of which are incorporated herein by reference.

FIELD

The present disclosure generally relates to rotors for electric machines and, more particularly, to rotor hollow shafts for rotors of electric machines.

BACKGROUND

As is evident for example from DE 42 40 045 C1 and DE 203 07 198 U1, such rotor hollow shafts have long been known and are used wherever it is sought to achieve a construction which is as lightweight as possible. If the rotor hollow shafts are "assembled" from multiple parts, in particular a cylinder barrel and two end flanges, they are also referred to as "assembled" rotor shafts.

With regard to hollow rotor shafts of electric machines, it is also known for these to be flowed through by a medium in particular for the purposes of cooling the rotor. In this regard, reference is made for example to EP 0 659 308 or DE 199 13 199 A1, wherein the cooling medium is conducted via a pipe into the cavity and through this back to an outlet. It has however been found that this type of cooling is inadequate and is not in proportion to the outlay in terms of construction and to the impairment of the running characteristics of the motor.

Furthermore, electric machines are known in the case of which a medium, for example a lubricant or coolant, must be transported from one end side to the other, for example because an oil pan is provided on one side, but the oil is required at a different location. In this case, the rotor comprises purely a leadthrough function. Hitherto known hollow shafts are scarcely suitable for this function because the medium is supplied via a narrow duct formed into the shaft journal, and then distributes in the hollow shaft of significantly greater diameter in order to emerge again on the other side through a narrow duct. Such a leadthrough of liquid medium may be advantageous for the purposes of supplying the cooling medium to the stator, for example.

In the case of such machines with a leadthrough function, it is possible, owing to the considerable widening of the line cross section, for running roughness to arise, which is caused by the expansion of the medium into the hollow shaft and by the turbulence within the hollow shaft. Furthermore, a hollow shaft that is completely filled with liquid medium cancels out the advantage of the weight saving. In particular, with regard to use in the electric machine, filling a hollow cylinder with liquid has an adverse effect on the rotational inertia of said hollow cylinder. In this respect, the disadvantages of said prior art lie in the unduly large medium volume in the rotor shaft cavity and in the unduly heavy rotor shaft, and/or in the restricted possibility of optimization for a low weight.

DETAILED DESCRIPTION

Figure 1:
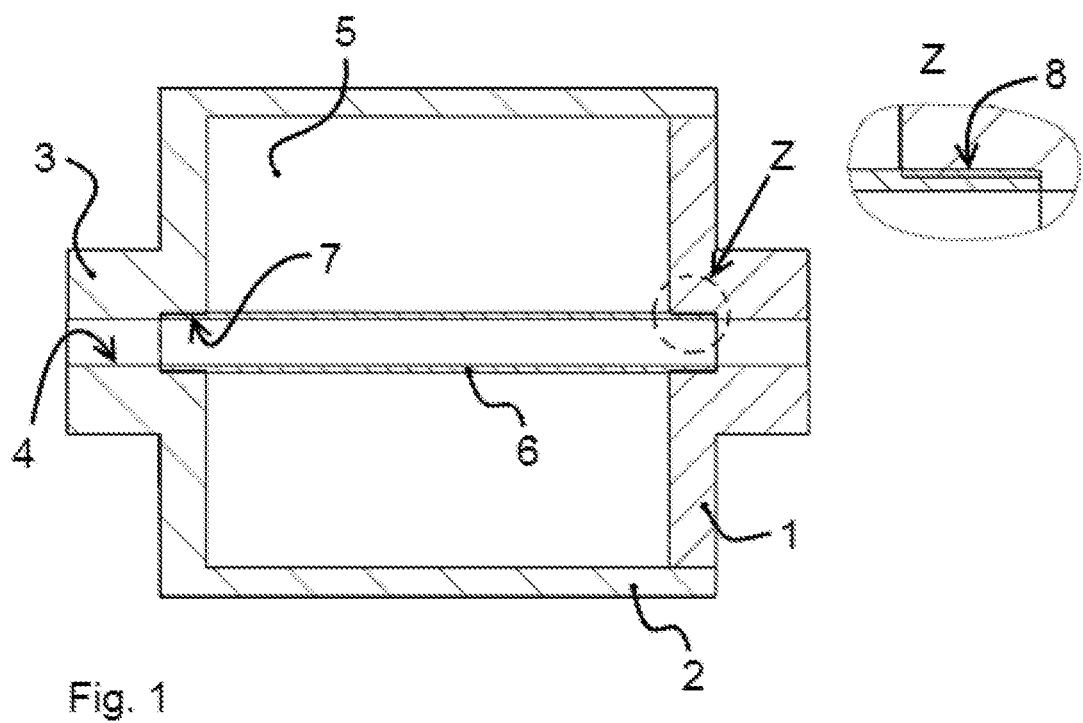
FIG. 1 is a cross-sectional view of an example rotor hollow shaft.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns rotor hollow shafts for rotors of electric machines. One example object of the present disclosure concerns a rotor hollow shaft that has a simple construction, that can be produced inexpensively, that has an excellent leadthrough function, that is low weight, and that exhibits good running characteristics. To that end, in some examples, a rotor hollow shaft may comprise a cylinder barrel that is closed off on both sides by end flanges, wherein in each case a shaft journal may be situated on the end flanges. Further, at least in one of the end flanges, in particular in the shaft journal, there may be provided a coaxial access bore that provides access for a medium to a shaft cavity surrounded by a cylinder barrel. The present disclosure also generally concerns rotors that have a rotor hollow shaft equipped with lamination assemblies and corresponding electric machines.

Accordingly, the essential aspect of the rotor hollow shaft according to the invention lies in the hollow leadthrough element which is arranged within the shaft cavity and which ensures the throughflow of the liquid or gaseous medium from one shaft journal to the other with low friction owing to highly laminar conditions. According to the invention, said leadthrough element is fitted into the access bore of the end-side shaft journal so as to impart a sealing action with respect to the shaft cavity, such that no medium passes into the shaft cavity. The leadthrough element leads through the surrounding shaft cavity to the other shaft journal, where said leadthrough element is likewise fitted so as to impart a sealing action with respect to the shaft cavity. Here, embodiments of the rotor hollow shaft are conceivable in which the medium emerges coaxially again on the other side in a straight jet. In other embodiments, the flow of the medium is led out of the leadthrough element at the other end in a radial direction, for example in order to make it possible for the stator windings to be impinged on with cooling medium.

The invention ensures the transportation of media, in particular liquids, such as lubricant and coolant, or gases, for example compressed air, through a hollow cylindrical rotor shaft. Here, it is provided that the medium is conducted into the rotor shaft on one side, and is conducted onward to the other axial shaft end or to radial outlet points at the other shaft end. Here, the volume of the medium is limited to the smallest possible amount necessary for the application, wherein the structural design is independent of the construction and cavity volume of the rotor shaft. The axial media transport realized in this way, and the means required for this purpose, do not generate an imbalance, because the mass is distributed coaxially and uniformly with respect to the axis of rotation, and, in the best case, is of circular form concentrically with respect to the center of rotation.

Through the provision of the leadthrough element, the leadthrough function is decoupled from the further design of the rotor hollow shaft, such that, despite the leadthrough, a large cavity, which can be designed freely in terms of geometry, remains in the lightweight rotor shaft. In this context, it is pointed out that the claimed feature "fitted" may also mean that the leadthrough element is, as a cylindrical tube, integrally formed onto the end flanges in unipartite fashion in particular by way of the process of rotary swaging, and, in effect, forms the access bore which is accessible axially from the outside. In a particularly simple embodiment, the leadthrough element is however a separate component of an otherwise "assembled" rotor, which component is fitted (installed) into the shaft journal by way of a seal or is joined in a joining process. Here, a joining process that involves plastic deformation in particular of the leadthrough element is expedient.

Even though the leadthrough element is also suitable for the leadthrough of gaseous media without problems, the advantages of the rotor hollow shaft according to the invention come to bear in particular in the case of liquid media such as oil or water being used. Said advantages lie in particular in the fact that the leadthrough element according to the invention can be used even in the case of an existing geometry of the rotor, such that no structural modifications need to be made either to the lamination assemblies or to the stator or to other components. On the contrary, with the leadthrough element according to the invention, it is possible, substantially independently of the surrounding geometry, for the abovementioned functions to be optimized in parallel. In particular, the optimum leadthrough function is ensured along with the greatest possible reduction in weight of the rotor. A further advantage is that the additional function of the media transport can, owing to the flow cross section, which can be freely designed, of the leadthrough element, be adapted to the volume requirement and to the running characteristics of the rotor.

In an embodiment which is particularly advantageous owing to its simplicity, the leadthrough element is a hollow cylindrical pipe piece which projects through the shaft cavity from one end side to the other end side and whose outer diameter is considerably smaller than the inner diameter of the shaft cavity. Ideally, the inner diameter is equal to the inner diameter of the access bore, such that edges at which turbulence can arise are avoided.

In the exemplary embodiment in which the leadthrough element is a separate component in particular in the form of a pipe piece, a distinction can in turn be made between two variants. In the first variant, the pipe piece is pressed into a cylindrical receptacle which, on the inner side of the end flange, surrounds the inner mouth of the access bore. In this first embodiment, the pipe piece starts in each case behind the access bore. This is particularly suitable for assembled rotors. In the other, second variant, the pipe piece is pressed into both access bores so as to terminate flush, by way of the two outer edges, with the rim of the access bore in each case. The pipe piece itself thus forms the access bore into which it is inserted. This embodiment is particularly suitable for the equipping of unipartite rotor shafts.

In both embodiments, the inner and the outer diameter of the leadthrough element can, within the circumstances, be dimensioned in a manner suited to the volume flow requirement of the medium to be led through and independently of the construction of the rotor shaft and the volume of the cavity of the hollow shaft. Here, it is advantageous for the amount of the medium flowing through to be restricted to the actual requirement. A constant cross section of the leadthrough element offers the best conditions in this regard.

In the case of the first embodiment, the pipe piece is advantageously pressed at both sides into a ring-shaped receptacle formed on the inner side of the respective end flange, in which receptacle there is formed in each case one sealing edge. Here, the sealing edge comprises the function of a cutting ring and makes it possible for additional sealing means to be dispensed with. Here, the pressing-in with sealing action is associated with a deformation of those ends of the pipe piece which are pressed into the receptacles, the pipe piece being manufactured from a softer material, in particular aluminum or plastic, than the end flanges. Here, the outer diameter of the pipe piece comprises an overlap, that is to say an oversize, with respect to the sealing edge diameter of the receptacle. During the pressing-in process, a partial plastic material displacement is realized on the outer diameter of the relatively low-strength pipe piece by way of the sealing edge geometry in the receptacle, wherein the receptacles are formed in each case into the end flange composed of a material of relatively high strength, for example a steel. The seal which is thus produced and which is cut into the soft pipe piece functions without additional sealing means over the entire temperature range. A length of the sealing edge of between 1 mm and 4 mm, depending on the diameter of the receptacle, is advantageous, wherein a length of 2 mm has proven to be particularly suitable.

In the case of the first embodiment, the rotor hollow shaft is advantageously constructed from multiple components, specifically from the cylinder barrel of the rotor, from the pipe piece situated therein and from the two end flanges which receive the pipe piece and which support the cylinder barrel. Said components may be assembled by way of joining processes, wherein it is advantageously the case that, firstly, the pipe piece is pressed into a receptacle, said pre-assembled unit is then joined to the cylinder barrel, and finally, during the pressing-on of the second end flange, in a parallel process, the joining connection between cylinder barrel and end flange, and the pressed-in connection of pipe piece and receptacle with sealing action, are produced.

In the case of the second embodiment, in which the pipe piece is fitted into both access bores and terminates in each case flush with the outer edge of the access bore, it is advantageous if the pipe piece is fitted sealingly into the access bores in the presence of a temperature difference between pipe piece and end flanges. For this purpose, the access bores are widened by virtue of the end flanges or the entire rotor hollow shaft being heated, before the pipe piece, which has advantageously been "shrunk" by cooling, is inserted. As the temperatures equalize, the pipe piece is pressed sealingly into the access bores.

The use of pipe pieces also makes it possible to realize multiple separate flow cross sections by way of correspondingly multiple pipe pieces running parallel or multiple ducts in one pipe piece. It is thus possible for different functions, such as lubrication and cooling, or the separate guidance of different media, such as water and oil, to be realized simultaneously.

FIG. 1 shows a rotationally symmetrical rotor hollow shaft for the rotor of an electric machine. Said rotor hollow shaft comprises a cylinder barrel 2 which is closed off on both sides by end flanges 1 composed of steel, wherein in each case one shaft journal 3 is situated on the end flanges 1. Here, the shaft journal may be formed on the end flange in unipartite fashion, or may be a separate component that is held on the end flange. In this case, coaxial access bores 4 are provided on both shaft journals, which access bores, for as long as they are not closed off, provide access to the shaft cavity 5 that is surrounded by a cylinder barrel 2. As a leadthrough element, a hollow cylindrical pipe piece 6 composed of soft material such as aluminum or plastic is provided, the outer diameter of which hollow cylindrical pipe piece is, as can be seen, smaller than the inner diameter of the shaft cavity 5. The pipe piece 6 is, at the shaft cavity side 5, pressed at both sides into turned-out ring-shaped receptacles 7 which are turned in around the access bores 4. The pressing of the pipe piece 6 into the receptacles 7 gives rise to a sealing action with respect to the shaft cavity 5, such that a liquid or gaseous medium conducted through the pipe piece 6 from one shaft journal to the other does not pass into the shaft cavity 5. In this case, the inner diameter of the pipe piece 6 is slightly smaller than the inner diameter of the access bore 4, wherein the two inner diameters are approximately equal.

The pressing of the relatively soft pipe piece 6 into the receptacles 7 of the relatively hard end flanges 1 is realized by way of a sealing edge process, a special joining process. Here, the pressed-in end of the pipe piece 6 plastically deforms against a ring-shaped sealing edge 8 (see detail Z) which is provided in the receptacle 7.

Figure 2:
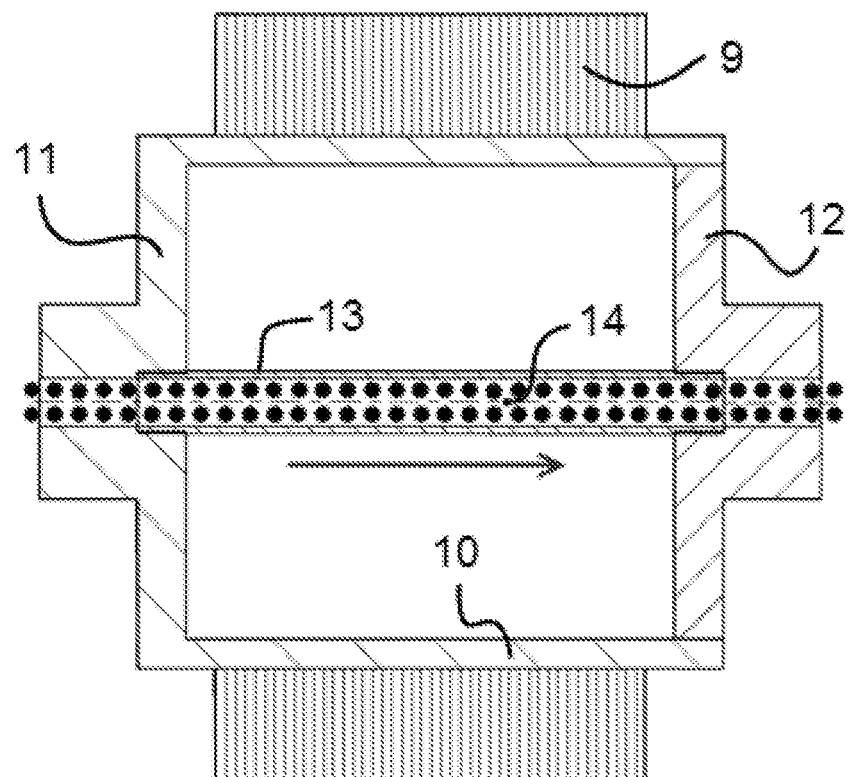
FIG. 2 is a cross-sectional view of a medium flowing through an example rotor.

FIG. 2 shows a rotor having a rotor hollow shaft which is equipped with lamination assemblies 9, having an end flange 11 which is integrally formed on the cylinder barrel 10 on one side, and having an end flange 12 which is pressed into the cylinder barrel 10 on the other side. A leadthrough element in the form of a pipe piece 13 is pressed in between the end flanges 11 and 12, which pipe piece is flowed through by a liquid medium 14 coaxially in the direction of the arrow.

Figure 3:
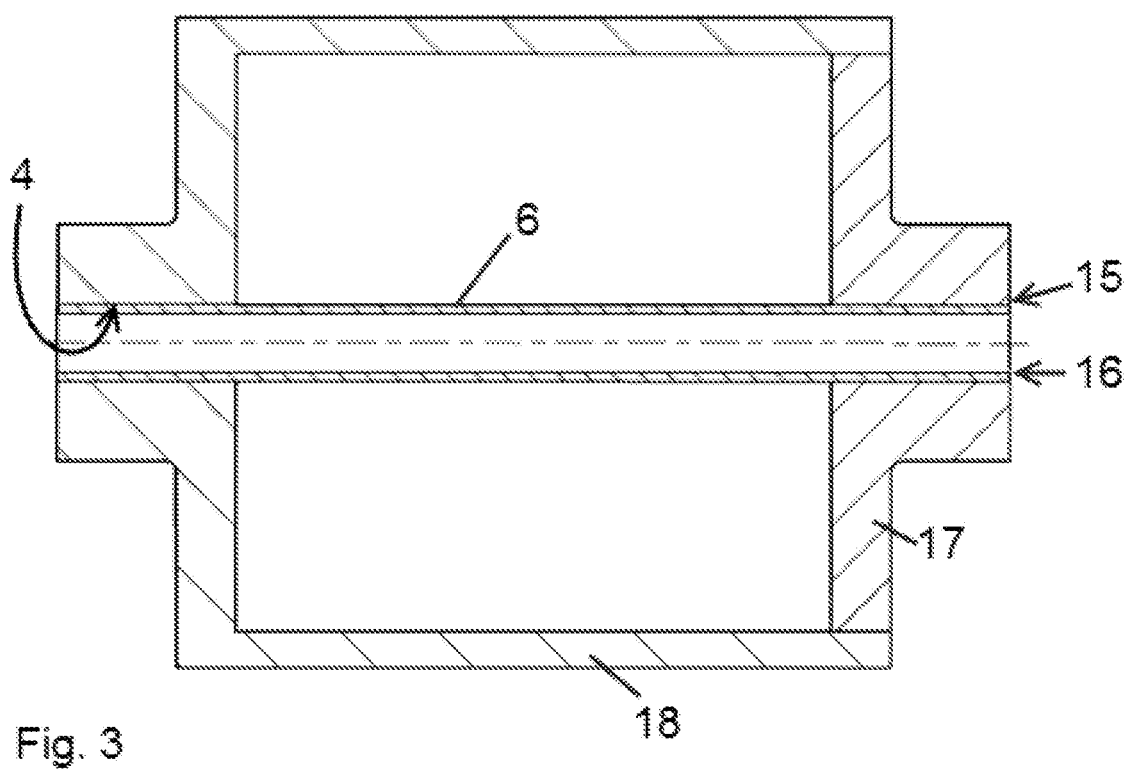
FIG. 3 is a cross-sectional view of another example rotor hollow shaft.

FIG. 3 shows the second embodiment of a rotor hollow shaft, in the case of which the pipe piece 6, which is fitted into both access bores 4, terminates, in each case by way of its outer edge 16, flush with the edge 15 of the access bore 4. In this case, the end flanges 17 and the barrel 18 are molded in unipartite fashion to form the rotor hollow shaft in a casting process. The pipe piece 6 is fitted sealingly into the access bores 4 in the presence of a temperature difference.

Figure 4:
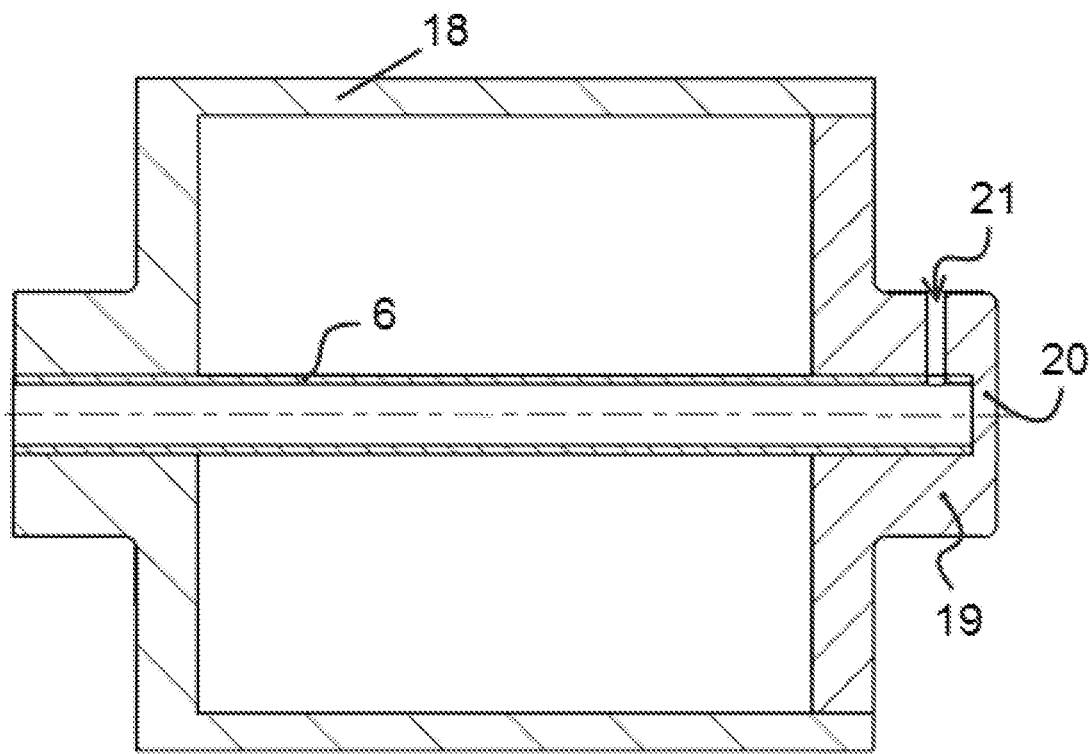
FIG. 4 is a cross-sectional view of an example rotor hollow shaft having a radial outlet.

FIG. 4 shows a design variant of the rotor hollow shaft as per FIG. 3, in the case of which the pipe piece 6 is fitted into a receptacle 19 on one side and is axially closed off by the base 20 of the receptacle 19. The medium is conducted out through a bore 21 which is formed radially in the pipe piece 6 and in the receptacle 19.

LIST OF REFERENCE DESIGNATIONS

1 End flange
2 Cylinder barrel
3 Shaft journal
4 Access bore
5 Shaft cavity
6 Pipe piece
7 Receptacle
8 Sealing edge
9 Lamination assembly
10 Cylinder barrel
11 Integrally formed end flange
12 Pressed-in end flange
13 Pipe piece
14 Liquid medium
15 Edge of the access bore
16 Edge of the pipe piece
17 End flange of the unipartite rotor hollow shaft
18 Barrel of the unipartite rotor hollow shaft
19 Pot-shaped receptacle
20 Base of the receptacle
21 Radially oriented bore

What is claimed is:

1. A rotor hollow shaft for a rotor of an electric machine, the rotor hollow shaft comprising:
    a cylinder barrel that surrounds a shaft cavity and is closed off on a first side by an end flange and on a second side by an end flange;
    a shaft journal positioned or formed on each of the end flanges, wherein at least one of the end flange or the shaft journal on the first side of the cylinder barrel includes an access bore that provides access to the shaft cavity; and
    a leadthrough element fitted into the access bore so as to impart a sealing action with respect to the shaft cavity, the leadthrough element extending through the shaft cavity from the first side of the cylinder barrel to the end flange or the shaft journal on the second side of the cylinder barrel where the leadthrough element is fitted so as to impart a sealing action with respect to the shaft cavity, wherein the leadthrough element permits leadthrough of a liquid or gaseous medium,
    wherein the leadthrough element is a hollow cylindrical pipe piece with an outer diameter that is smaller than an inner diameter of the shaft cavity;
    wherein the hollow cylindrical pipe piece is pressed into a cylindrical receptacle on an inner side of the end flange on the first side of the cylinder barrel, the cylindrical receptacle surrounding an inner mouth of the access bore, wherein an inner diameter of the hollow cylindrical pipe piece is at least approximately equal to an inner diameter of the access bore, and
    wherein the hollow cylindrical pipe piece is manufactured from a material that is softer than a material of which the end flange on the first side of the cylinder barrel is comprised, wherein the hollow cylindrical pipe piece is deformed as a result of the hollow cylindrical pipe piece being pressed into the cylindrical receptacle, wherein a sealing edge is formed between the hollow cylindrical pipe piece and the cylindrical receptacle.

2. The rotor hollow shaft of claim 1 wherein the hollow cylindrical pipe piece is pressed into the cylindrical receptacle on an inner side of the end flange on the second side of the cylinder barrel.

3. The rotor hollow shaft of claim 1 wherein the hollow cylindrical pipe piece is comprised of plastic or aluminum.

4. The rotor hollow shaft of claim 1 comprising a multipart construction comprised of the cylinder barrel, the hollow cylindrical pipe piece, and the end flanges, wherein the cylinder barrel, the hollow cylindrical pipe piece, and the end flanges are assembled in joining processes.

5. The rotor hollow shaft of claim 1 wherein the leadthrough element is a hollow cylindrical pipe piece with an outer diameter that is smaller than an inner diameter of the shaft cavity, wherein at least one of the end flange or the shaft journal on the second side of the cylinder barrel comprises the access bore, with the hollow cylindrical pipe piece being fitted into both access bores and terminating flush with outer edges of the access bores.

6. The rotor hollow shaft of claim 5 wherein the hollow cylindrical pipe piece is fitted sealingly into the access bores in the presence of a temperature difference between the hollow cylindrical pipe piece and the end flanges.

7. The rotor hollow shaft of claim 5 wherein the end flanges are integral with the cylinder barrel.

8. The rotor hollow shaft of claim 7 wherein the end flanges are integrally formed on the cylinder barrel in unipartite fashion.

9. The rotor hollow shaft of claim 8 wherein the end flanges are formed integrally on the cylinder barrel in a casting process.

10. A rotor comprising the rotor hollow shaft of claim 1.

11. An electric machine comprising a rotor that includes the rotor hollow shaft of claim 1.

* * * * *